United States Patent
Niemi (10) Patent No.: US 9,792,012 B2
(45) Date of Patent: Oct. 17, 2017

(54) METHOD RELATING TO DIGITAL IMAGES

(75) Inventor: Sami Niemi, Örnvägen (SE)

(73) Assignee: Mobile Imaging in Sweden AB, Lund (SE)

( * ) Notice: Subject to any disclaimer, the term of this patent is extended or adjusted under 35 U.S.C. 154(b) by 874 days.

(21) Appl. No.: 13/499,711

(22) PCT Filed: Sep. 22, 2010

(86) PCT No.: PCT/SE2010/051019
§ 371 (c)(1),
(2), (4) Date: Jun. 6, 2012

(87) PCT Pub. No.: WO2011/040864
PCT Pub. Date: Apr. 7, 2011

(65) Prior Publication Data
US 2012/0262490 A1  Oct. 18, 2012

(30) Foreign Application Priority Data
Oct. 1, 2009 (SE) .................................. 0901263-4

(51) Int. Cl.
*G06F 3/041* (2006.01)
*G09G 5/00* (2006.01)
(Continued)

(52) U.S. Cl.
CPC .......... *G06F 3/04842* (2013.01); *G06F 3/041* (2013.01); *G06F 3/0488* (2013.01);
(Continued)

(58) Field of Classification Search
CPC .................................................... G06F 3/0488
See application file for complete search history.

(56) References Cited

U.S. PATENT DOCUMENTS 5,138,460 A    8/1992  Egawa
5,657,402 A *  8/1997  Bender ................. G06T 3/4038
                                                    348/218.1
(Continued)

FOREIGN PATENT DOCUMENTS

CN    1471375 A    1/2004
CN    1750593 A    3/2006
(Continued)

OTHER PUBLICATIONS

International Search Report.
(Continued)

*Primary Examiner* — James A Thompson
*Assistant Examiner* — Tapas Mazumder
(74) *Attorney, Agent, or Firm* — Alston & Bird LLP (57) ABSTRACT

The present invention is related to a method for selecting an image comprises forming a group of digital image representations, displaying a first digital image representation of the group of digital image representations on a touch sensitive display, generating a position signal in response to a detection of a pointing device on the touch sensitive display, said position signal indicating a touch position, identifying a selected position within the displayed first digital image representation based on the position signal, generating a zoom-in signal in response to a detection of the pointing device sliding away from the touch position on the touch display, said zoom signal indicating a sliding distance from the touch position, displaying an enlarged representation of the first digital image representation in response to the zoom-in signal, generating a shift signal in response to a detection of a second sliding motion of the fingertip on the touch sensitive display, and displaying a second digital image representation and an enlarged representation of the second digital image representation in response to the shift
(Continued)

signal, the enlargement of the subarea being based on the zoom signal generated during displaying of the first digital image representation.

19 Claims, 4 Drawing Sheets

(51) Int. Cl.
*G06F 3/0484* (2013.01)
*G06F 3/0488* (2013.01)

(52) U.S. Cl.
CPC .............. *G06F 2203/04104* (2013.01); *G06F 2203/04805* (2013.01); *G06F 2203/04808* (2013.01)

(56) References Cited

U.S. PATENT DOCUMENTS

| | | | |
|---|---|---|---|
| 5,689,611 | A | 11/1997 | Ohta et al. |
| 6,075,905 | A | 6/2000 | Herman et al. |
| 6,105,045 | A | 8/2000 | Kurabayashi et al. |
| 6,249,616 | B1 | 6/2001 | Hashimoto |
| 6,304,284 | B1 | 10/2001 | Dunton et al. |
| 6,529,627 | B1 | 3/2003 | Callari et al. |
| 6,542,645 | B1 | 4/2003 | Silverbrook et al. |
| 6,621,524 | B1 | 9/2003 | Iijima et al. |
| 6,724,386 | B2 | 4/2004 | Clavadetscher |
| 6,750,903 | B1 | 6/2004 | Miyatake et al. |
| 6,927,874 | B1 | 8/2005 | Enokida et al. |
| 6,930,703 | B1 | 8/2005 | Hubel et al. |
| 6,975,352 | B2 | 12/2005 | Seeger et al. |
| 6,985,172 | B1 | 1/2006 | Rigney et al. |
| 7,099,510 | B2 | 8/2006 | Jones |
| 7,133,069 | B2 | 11/2006 | Wallach et al. |
| 7,133,169 | B2 | 11/2006 | Terashima et al. |
| 7,199,829 | B2 | 4/2007 | Matsui et al. |
| 7,339,580 | B2 | 3/2008 | Westerman et al. |
| 7,508,438 | B2 | 3/2009 | Okamoto et al. |
| 7,623,733 | B2 | 11/2009 | Hirosawa |
| 7,639,897 | B2 | 12/2009 | Gennetten et al. |
| 7,659,923 | B1 | 2/2010 | Johnson |
| 7,787,664 | B2 | 8/2010 | Luo et al. |
| 8,077,213 | B2 | 12/2011 | Gulliksson |
| 8,127,232 | B2 | 2/2012 | Pavley et al. |
| 8,160,152 | B2 | 4/2012 | Murayama et al. |
| 8,249,332 | B2 | 8/2012 | Stevens et al. |
| 8,463,020 | B1* | 6/2013 | Schuckmann et al. ........ 382/154 |
| 8,494,306 | B2 | 7/2013 | Sorek et al. |
| 8,497,920 | B2 | 7/2013 | Levoy et al. |
| 8,594,460 | B2 | 11/2013 | Lindskog et al. |
| 9,196,069 | B2 | 11/2015 | Lindskob |
| 9,344,642 | B2 | 5/2016 | Niemi |
| 9,396,569 | B2 | 7/2016 | Lindskog |
| 9,432,583 | B2 | 8/2016 | Niemi |
| 2001/0010546 | A1 | 8/2001 | Chen |
| 2001/0020978 | A1 | 9/2001 | Matsui et al. |
| 2001/0048802 | A1 | 12/2001 | Nakajima et al. |
| 2002/0025796 | A1 | 2/2002 | Taylor et al. |
| 2002/0110286 | A1* | 8/2002 | Cheatle ................ H04N 1/0044 382/305 |
| 2002/0159632 | A1 | 10/2002 | Chui et al. |
| 2003/0071908 | A1 | 4/2003 | Sannoh et al. |
| 2003/0147000 | A1 | 8/2003 | Shiraishi |
| 2003/0189647 | A1* | 10/2003 | Kang ........................ 348/207.99 |
| 2003/0190090 | A1 | 10/2003 | Beeman et al. |
| 2004/0080661 | A1 | 4/2004 | Afsenius et al. |
| 2004/0097206 | A1 | 5/2004 | Grewing et al. |
| 2004/0165788 | A1 | 8/2004 | Perez et al. |
| 2004/0174434 | A1 | 9/2004 | Walker et al. |
| 2004/0189849 | A1 | 9/2004 | Hofer |
| 2004/0201699 | A1 | 10/2004 | Parulski et al. |
| 2004/0201755 | A1 | 10/2004 | Norskog |
| 2004/0218833 | A1 | 11/2004 | Ejiri et al. |
| 2004/0223649 | A1 | 11/2004 | Zacks et al. |
| 2004/0239767 | A1 | 12/2004 | Stavely et al. |
| 2005/0007483 | A1* | 1/2005 | Zimmermann ......... G06T 15/20 348/335 |
| 2005/0031214 | A1 | 2/2005 | Zhang et al. |
| 2005/0099514 | A1 | 5/2005 | Cozier et al. |
| 2005/0122412 | A1 | 6/2005 | Shirakawa et al. |
| 2005/0168594 | A1 | 8/2005 | Larson et al. |
| 2006/0001650 | A1* | 1/2006 | Robbins ................ G06F 3/0421 345/173 |
| 2006/0022961 | A1* | 2/2006 | Kaminaga ..................... 345/173 |
| 2006/0028579 | A1 | 2/2006 | Sato |
| 2006/0038908 | A1* | 2/2006 | Yoshino ................... 348/333.11 |
| 2006/0044444 | A1 | 3/2006 | Okamoto et al. |
| 2006/0050152 | A1 | 3/2006 | Rai et al. |
| 2006/0061845 | A1 | 3/2006 | Lin |
| 2006/0078224 | A1 | 4/2006 | Hirosawa |
| 2006/0171687 | A1 | 8/2006 | Aiso |
| 2006/0181614 | A1 | 8/2006 | Yen et al. |
| 2006/0181619 | A1 | 8/2006 | Liow et al. |
| 2006/0187321 | A1 | 8/2006 | Sakamoto |
| 2006/0235765 | A1 | 10/2006 | David |
| 2007/0024721 | A1 | 2/2007 | Rogers |
| 2007/0025723 | A1 | 2/2007 | Baudisch et al. |
| 2007/0030363 | A1 | 2/2007 | Cheatle et al. |
| 2007/0055651 | A1 | 3/2007 | Yamanaka et al. |
| 2007/0058064 | A1 | 3/2007 | Hara et al. |
| 2007/0081081 | A1 | 4/2007 | Cheng |
| 2007/0097206 | A1 | 5/2007 | Houvener et al. |
| 2007/0224980 | A1 | 9/2007 | Wakefield |
| 2007/0237420 | A1 | 10/2007 | Luo et al. |
| 2007/0274563 | A1 | 11/2007 | Jung et al. |
| 2007/0274705 | A1 | 11/2007 | Kashiwa et al. |
| 2008/0062141 | A1 | 3/2008 | Chandhri |
| 2008/0143744 | A1 | 6/2008 | Agarwala |
| 2008/0152258 | A1 | 6/2008 | Tulkki |
| 2008/0165141 | A1 | 7/2008 | Christie |
| 2008/0218611 | A1 | 9/2008 | Parulski et al. |
| 2008/0218613 | A1 | 9/2008 | Janson et al. |
| 2009/0019399 | A1 | 1/2009 | Matsunaga et al. |
| 2009/0021576 | A1 | 1/2009 | Linder |
| 2009/0046943 | A1* | 2/2009 | Ishiga ........................... 382/266 |
| 2009/0073285 | A1 | 3/2009 | Terashima |
| 2009/0141046 | A1 | 6/2009 | Rathnam et al. |
| 2009/0190803 | A1 | 7/2009 | Neghina et al. |
| 2009/0204920 | A1 | 8/2009 | Beverley et al. |
| 2009/0244301 | A1* | 10/2009 | Border et al. ........... 348/208.99 |
| 2009/0245685 | A1 | 10/2009 | Makii |
| 2009/0251591 | A1 | 10/2009 | Whitham |
| 2009/0290759 | A1 | 11/2009 | Stevens et al. |
| 2009/0295830 | A1* | 12/2009 | Muraveynyk et al. ....... 345/629 |
| 2009/0303338 | A1 | 12/2009 | Chaurasia et al. |
| 2009/0309990 | A1 | 12/2009 | Levoy et al. |
| 2009/0322926 | A1 | 12/2009 | Ikeda et al. |
| 2010/0025123 | A1 | 2/2010 | Lee et al. |
| 2010/0045608 | A1* | 2/2010 | Lessing ......................... 345/173 |
| 2010/0053353 | A1 | 3/2010 | Hunter et al. |
| 2010/0079498 | A1* | 4/2010 | Zaman et al. ................. 345/661 |
| 2010/0149367 | A1 | 6/2010 | Yim et al. |
| 2010/0268729 | A1 | 10/2010 | Nara et al. |
| 2011/0141227 | A1 | 6/2011 | Bigioi et al. |
| 2011/0200259 | A1 | 8/2011 | Lindskog et al. |
| 2012/0105601 | A1 | 5/2012 | Jeon et al. |
| 2012/0262490 | A1 | 10/2012 | Niemi |
| 2013/0300822 | A1 | 11/2013 | Mills |
| 2014/0101590 | A1 | 4/2014 | Lindskob et al. |
| 2014/0177975 | A1 | 6/2014 | Lindskob et al. |
| 2014/0184852 | A1 | 7/2014 | Niemi |

FOREIGN PATENT DOCUMENTS

| | | |
|---|---|---|
| EP | 1 309 171 A2 | 5/2003 |
| EP | 1 613 060 A1 | 1/2006 |
| EP | 1942401 A1 | 7/2008 |
| EP | 2 124 186 A1 | 11/2009 |
| EP | 2 175 635 A1 | 4/2010 |
| EP | 2 323 102 A1 | 5/2011 |
| JP | H11-88811 A | 3/1999 |
| JP | 2010 020581 A | 1/2010 |
| TW | 401687 B | 8/2000 |

(56) References Cited

FOREIGN PATENT DOCUMENTS

| | | |
|---|---|---|
| WO | WO 99/51027 A1 | 10/1999 |
| WO | WO 01/59709 A1 | 8/2001 |
| WO | WO 03/105466 A1 | 12/2003 |
| WO | WO 2004/068865 A1 | 8/2004 |
| WO | WO 2005/036780 A1 | 4/2005 |
| WO | WO 2005/050567 A1 | 6/2005 |
| WO | WO 2005/112437 A1 | 11/2005 |
| WO | WO 2006/002796 A1 | 1/2006 |
| WO | WO-2007006075 A1 | 1/2007 |
| WO | WO 2007/038198 A1 | 4/2007 |
| WO | WO-2008038883 A1 | 4/2008 |
| WO | WO 2008/064349 A1 | 5/2008 |
| WO | WO 2009/156561 A1 | 12/2009 |
| WO | WO 2010/072587 A1 | 7/2010 |
| WO | WO 2011/040864 A1 | 4/2011 |

OTHER PUBLICATIONS

Notice of Allowance for U.S. Appl. No. 14/037,563 dated Jul. 20, 2015.
Office Action for U.S. Appl. No. 14/118,493 dated Aug. 4, 2015.
Extended European Search Report for corresponding European Application No. 11153998.7 Aug. 12, 2015, 9 pages.
Xiong, Y. et al., *Fast Panorama Stitching n Mobile Devices*, Consumer Electronics (ICCE), 2010 Digest of Technical Papers International Conference, (Jan. 2010) 319-320.
Extended European Search Report for corresponding European Application No. 12814902.8 dated Jun. 1, 2015, 9 pages.
International Type Search Report and Written Opinion for Application No. ITS/SE10/00290 dated May 2, 2011.
International Search Report and Written Opinion for Application No. PCT/SE2012/050688 dated Oct. 26, 2012.
Office Action for Canadian Application No. 2,841,910 dated Apr. 17, 2015.
Peleg, S. et al., *Stereo Panorama With a Single Camera*, Proceedings of the 1999 IEEE Computer society conference on Computer Vision and Pattern Recognition, IEEE, vol. 1 (Jun. 1999) pp. 395-401.
Shum, H-Y. et al., *Rendering with Concentric Mosaics*, SIGGRAPH 99, ACM (1999) 299-306.
Farin, et al., *Shortest Circular Paths on Planar Graphs*, 27th Symposium on Information Theory in the Benelux (2006) pp. 117-124.
Itti, et al., *A Model of Saliency-based Visual Attention for Rapid Scene Analysis*, IEEE Transactions on Pattern Analysis and Machine Intelligence, vol. 20, No. 11 (1998) pp. 1254-1259.
Ling., H. et al., *Diffusion Distance for Histogram Comparison*, IEEE Computer Society Conference on Computer Vision and Pattern Recognition, (2006) 8 pages.
Jiebo Luo et al. *Highly Automated Image Recomposition: The Picture You Wish You Had Taken*, 2006 Western New York Image Processing Workshop, Sep. 29, 2006, Rochester Institute of Technology, Chester F. Carlson Center for Imaging Science Auditorium, Building 76, Rochester, NY 14623. Download from Internet http://citeseerx.ist.psu.edu/viewdoc/download?doi=10.1.1.102.8032&rep=rep1&type=pdf#p.=27.
Matthews, K. E. et al., *Sumiltaneous Motion Parameter Estimation and Image Segmentation using the EM Algorithm*, Oct. 23-26, 1995, download from internet: http://ieeexplore.ieee.org/xpl/login.jsp?reload=true&tp=&arnumber=531423 &url=http%3A%2F%2Fieeexplore.ieee.org%2Fxpls%2Fabs_all.jsp%3Farnumber%3D531423.
Ojala, T. et al., *Multiresolution Gray-Scale and Rotation Invariant Texture Classification With Local Binary Patterns*, IEEE Transactions on Pattern Analysis and Machine Intelligence, vol. 24, No. 7 (Jul. 2002) 971-987.
Oliva, A. et al., *Modeling the Shape of the Scene: A Holistic Representation of the Spatial Envelope*, International Journal of Computer Vision 42(3), (2001) 145-175.

Aseem Agarwala, et al., *Interactive Digital Photomontage*, ACM Transactions on Graphics, Aug. 1, 2004, vol. 23, No. 3, pp. 294-302; ISSN: 0730-0301; XP-002359799; figure 1; abstract.
A.A.Isola, et al., *Motion compensated iterative reconstruction of a region of Interest in cardiac cone-beam CT*, Computerized Medical Imaging and Graphics, Mar. 1, 2010, vol. 34, No. 2, pp. 149-159, ISSN:0895-6111, abstract.
Shutao Li et al., *Multifocus Image Fusion Using Region Segmentation and Spatial Frequency*, ScienceDirect, Image and Vision Computing, vol. 26 (2008) pp. 971-979.
Wandell, B. et al., *Multiple Capture Image Architecture With a CMOS Sensor*, Proceedings of the International Symposium on Multispectral Imaging and Color Reproduction for Digital Archives (Society of Multispectral Imaging of Japan), (Oct. 21-22, 1999) 11-17.
Canon: "Powershot S95 Camera User Guide" [online] [retrieved Jun. 1, 2015]. Retrieved from the Internet: UR: http://gdlp01.c-wss.com/gds/4/0300003994/02/PSS95_CUG_EN_02.pdf>. (dated 2010) 196 pages.
International Search Report: mailed Jul. 20, 2010; Search Request No. ITS/SE10/00034.
International Search Report/Written Opinion for Application No. PCT/SE2012/050584 dated Sep. 6, 2012.
Office Action for European Application No. 12 793 286.1 dated Oct. 2, 2014.
Supplementary European Search Report for Application No. EP 12 79 3286 dated Feb. 4, 2015.
Swedish Office Action dated Jul. 20, 2010; Ref: SE-21046020.
Office Action for European Application No. 11 15 3998 dated Mar. 9, 2015.
Office Action for U.S. Appl. No. 13/026,500 dated Jul. 31, 2012.
Office Action for U.S. Appl. No. 13/026,500 dated Jan. 2, 2013.
Notice of Allowance for U.S. Appl. No. 13/026,500 dated May 21, 2013.
Notice of Allowance for U.S. Appl. No. 13/026,500 dated Jul. 24, 2013.
Notice of Allowance for U.S. Appl. No. 14/037,563 dated Aug. 14, 2014.
Notice of Allowance for U.S. Appl. No. 14/037,563 dated Dec. 12, 2014.
Notice of Allowance for U.S. Appl. No. 14/037,563 dated Mar. 31, 2015.
Third-Party Submission for U.S. Appl. No. 14/037,708 dated Jun. 12, 2015.
Office Action for U.S. Appl. No. 14/118,493 dated Feb. 6, 2015.
Office Action for U.S. Appl. No. 14/037,708 dated Oct. 19, 2015.
Notice of Allowance for U.S. Appl. No. 14/118,493 dated Dec. 30, 2015.
Supplementary European Search Report for Application No. EP 10 82 0903 dated Dec. 18, 2015.
Office Action for U.S. Appl. No. 13/499,711 dated Oct. 5, 2015.
Office Action for U.S. Appl. No. 14/233,053 dated Sep. 11, 2015.
Atallah, M. J. et al., *An Optimal Algorithm for Shortest Paths on Weighted Interval and Circular-Arc Graphs, With Applications*, Algorithms ESA '93 Sep. 30, 1993 Springer, Berlin, Heidelberg, vol. 726, pp. 13-24.
Notice of Allowance for U.S. Appl. No. 14/037,708 dated Mar. 22, 2016.
Notice of Allowance for U.S. Appl. No. 14/118,493 dated Jan. 21, 2016.
Office Action for European Application No. 12 792 286.1 dated Feb. 15, 2016.
Baudisch, P. et al., *Panoramic Viewfinder: Shooting Panoramic Pictures with the Help of a Real-Time Preview*; UIST '05 (Oct. 2005) pp. 1-2.
Baudisch, P., et al., *Panoramic Viewfinder: Providing a Real-Time Preview to Help Users Avoid Flaws in Panoramic Pictures*, Proceedings of OZCHI, 2005, 10 pages.
Communication and extended search report issued by the European Patent Office in corresponding European patent application No. 07748329.5, dated Mar. 25, 2011.

(56) References Cited

OTHER PUBLICATIONS

Communication issued by the European Patent Office in corresponding European patent application No. 07748329.5, dated Mar. 1, 2016.
Communication issued by the European Patent Office in corresponding European patent application No. 07748329.5, dated Mar. 26, 2012.
Extended European Search Report from corresponding European Patent Application No. 11827056.0 dated Apr. 11, 2014.
International Preliminary Report on Patentability from corresponding International Patent Application No. PCT/SE2007/000680 dated Nov. 18, 2008.
International Search Report for Application No. PCT/SE2007/000680 dated Oct. 30, 2007.
International Search Report for Application No. PCT/SE2011/051124, dated Mar. 12, 2012.
Notice of Allowability for U.S. Appl. No. 14/233,053 dated May 10, 2016.
Notice of Allowance for U.S. Appl. No. 14/233,053 dated Apr. 29, 2016.
Notice of Allowance for U.S. Appl. No. 11/634,264, dated Dec. 2, 2010.
Notice of Allowance for U.S. Appl. No. 13/825,214 dated Aug. 24, 2016.
Notice of Allowance for U.S. Appl. No. 13/825,214 dated Aug. 4, 2016.
Notice of Allowance from corresponding U.S. Appl. No. 13/825,214 dated Sep. 8, 2016, 13 pages.
Notification of Reason for Rejection in Japanese Patent Application No. 2009-520706 mailed Aug. 30, 2011 (7 pages).
Office Action for European Application No. 12 814 902.8 dated Aug. 2, 2016.
Office Action for U.S. Appl. No. 11/634,264, dated Aug. 20, 2010.
Office Action for U.S. Appl. No. 11/634,264, dated Jan. 26, 2010.
Office Action for U.S. Appl. No. 11/634,264, dated Mar. 24, 2010.
Office Action for U.S. Appl. No. 11/634,264, dated May 22, 2009.
Office Action for U.S. Appl. No. 11/634,264, dated Sep. 4, 2009.
Office Action for U.S. Appl. No. 12/805,850, dated Apr. 8, 2011.
Office Action for U.S. Appl. No. 12/805,850, dated Oct. 12, 2011.
Office Action for U.S. Appl. No. 13/825,214 dated Mar. 24, 2016.
Office Action for U.S. Appl. No. 13/825,214 dated Oct. 21, 2015.
Office Action for U.S. Appl. No. 13/856,843 dated Apr. 22, 2015.
Office Action for U.S. Appl. No. 13/856,843 dated May 2, 2014.
Office Action for U.S. Appl. No. 13/856,843 dated Nov. 10, 2014.
Office Action for U.S. Appl. No. 13/856,843 dated Sep. 6, 2013.
Office Action from corresponding Chinese Patent Application No. 201180052544.7 dated Jan. 29, 2015.
Office Action from corresponding Chinese Patent Application No. 201310132668.7 dated Sep. 5, 2016.
Peleg, S., et al., Stereo Panorama with a Single Camera, Proceedings of the 1999 IEEE Computer Society Conference on Computer Vision and Patter Recognition; Jun. 23-25, 1999; Fort Collins, Colorado, IEEE, vol. 1, pp. 395-401.
Shum, H. Y., et al.; "Rendering with Concentric Mosaics;" SIGGRAPH 99; pp. 299-206; dated 1999.
Written Opinion from corresponding International Patent Application No. PCT/SE2007/000680 dated Oct. 30, 2007.
Written Opinion from corresponding International Patent Application No. PCT/SE2011/051124 dated Mar. 12, 2012.
Summons to attend oral proceedings pursuant to Rule 115(1) EPC in corresponding European patent application No. 07748329.5, dated Nov. 21, 2016.
Communication issued by the European Patent Office in corresponding European patent application No. 10820903.2 dated Jan. 24, 2017.
Extended European Search Report for corresponding European Application No. 16177376.7 dated Nov. 14, 2016, 5 pages.
Extended European Search Report for corresponding European Application No. 16177377.5 dated Nov. 14, 2016, 7 pages.
Decision to Grant a European Patent Pursuant to Article 97(1) EPC for European Patent Application No. 07748329.5 dated Aug. 18, 2017, 2 pages.
Office Action for U.S. Appl. No. 13/856,843 dated Aug. 26, 2017, 109 pages.

\* cited by examiner

METHOD RELATING TO DIGITAL IMAGES

TECHNICAL FIELD OF INVENTION

The present invention relates to a method for selecting an image and a method for facilitating generation or capturing of a desired image.

BACKGROUND TO THE INVENTION

A great number of the graphical or photographical images of today are generated digitally. Generally this results in that more images are created and many times a greater amount of undesirable images are created. One of the problems of today is that even undesired images are stored and thereby occupy storage capacity. One simple solution to this problem is to delete all undesired images. However, the likelihood of undesired images still occupying storage capacity becomes greater as the time pass from the time an image was created.

SUMMARY OF THE INVENTION

It is an object of the invention to improve operations on images and to improve the experience for the user of continuous operations on images.

This object is achieved by means of a method for selecting an image according to claim 1. Further embodiments of the invention are disclosed in the dependent claims.

In particular, according to a first aspect of the invention, a method for selecting an image comprises forming a group of digital image representations, displaying a first digital image representation of the group of digital image representations on a touch sensitive display, generating a position signal in response to a detection of a pointing device on the touch sensitive display, said position signal indicating a touch position, identifying a selected position within the displayed first digital image representation based on the position signal, generating a zoom-in signal in response to a detection of the pointing device sliding away from the touch position on the touch display, said zoom signal indicating a sliding distance from the touch position, displaying an enlarged representation of the first digital image representation in response to the zoom-in signal, generating a shift signal in response to a detection of a second sliding motion of the pointing device on the touch sensitive display, and displaying a second digital image representation and an enlarged representation of the second digital image representation in response to the shift signal, the enlargement of the second digital image representation being based on the zoom signal generated during displaying of the first digital image representation.

The advantage of forming a group of images is that the chance of having at least one good image is increased. By implementing the selection method the selection of the best image is facilitated and thereby it becomes easier for a user to discard less desirable images. Moreover, the zoom-in facilitates viewing of details in the high resolution image on a smaller preview screen.

According to one embodiment the sliding direction of the second sliding motion is along a trajectory that is substantially circular. This is an advantage in that the sliding motion determines the switching between images and if the number of images in the group of image representations are large, the touch sensitive display may not be big enough. However, by making the sliding motion circular there is no longer any limitations as it becomes possible to slide the pointing device many turns.

According to yet another embodiment the touch sensitive display is a multi-touch sensitive display, wherein said generating of a position signal further includes a detection of a second pointing device on the multi-touch sensitive display, said position signal indicating a touch position which is based on each position of the two pointing devices respectively, wherein said zoom-in signal is generated in response to a detection of the two pointing devices sliding on the multi-touch display away from each other, and wherein said shift signal is generated in response to a second sliding motion of the two pointing devices at substantially constant distance between the pointing devices.

In another embodiment the touch position is a position between the two detected pointing devices.

In yet another embodiment the act of displaying an enlarged representation of the first image includes displaying an enlarged subarea of the first digital image representation in response to the zoom-in signal, the position of the subarea within the first digital image representation being based on the selected position and the enlargement of the subarea being based on the zoom-in signal.

In one embodiment the size of the subarea to be enlarged is based on the distance between the two pointing devices at the generation of the position signal.

In another embodiment said forming of a group of digital image representations includes capturing a plurality of different digital image representations of essentially the same view at different points in time.

According to another embodiment said forming of a group of digital image representations includes capturing a plurality of different digital image representations of essentially the same view at different exposure settings.

According to yet another embodiment said forming of a group of digital image representations includes capturing a plurality of different digital image representations of essentially the same view having different focus distances.

According to a further embodiment said forming of a group of digital image representations includes capturing a plurality of different digital image representations of essentially the same view being exposed for different transforms.

According to yet another embodiment said forming of a group of digital image representations includes generating a plurality of digital image representations from one single original image by manipulating the original image differently for each digital, the manipulation includes applying a transform or a parameter to the original image.

According to another embodiment a pointing device is a fingertip.

BRIEF DESCRIPTION OF THE DRAWINGS

The invention will now be described in further detail by way of example under reference to the accompanying drawings, on which.

DETAILED DESCRIPTION OF A PREFERRED EMBODIMENT

The present invention will now be described more fully hereinafter with reference to the accompanying drawings, in which certain embodiments are shown. Like numbers refer to like elements throughout.

Figure 1A:
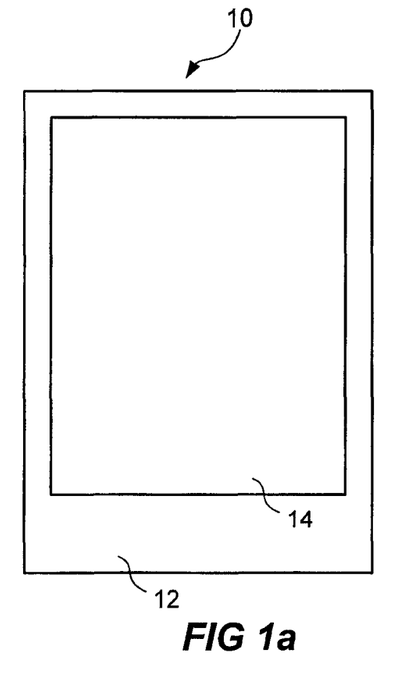
FIG. 1a is a schematic view of a display side of an image presentation device according to one embodiment of the invention.
Figure 1B:
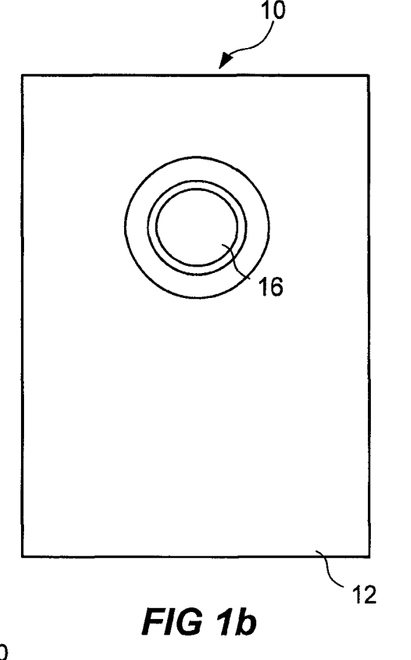
FIG. 1b is a schematic view of a lens side of an image presentation device incorporating a camera according to one embodiment of the invention.

In FIG. 1 an image presentation device 10 for implementing the invention is showed. According to one embodiment the image presentation device 10 includes housing 12 and a touch sensitive display 14, see FIG. 1a. It may also include a lens 16, see FIG. 1b, for focusing light to be captured as an image on an image sensor, not showed. The image presentation device 10 may, thus, be included in a camera or have a camera incorporated.

Figure 1C:
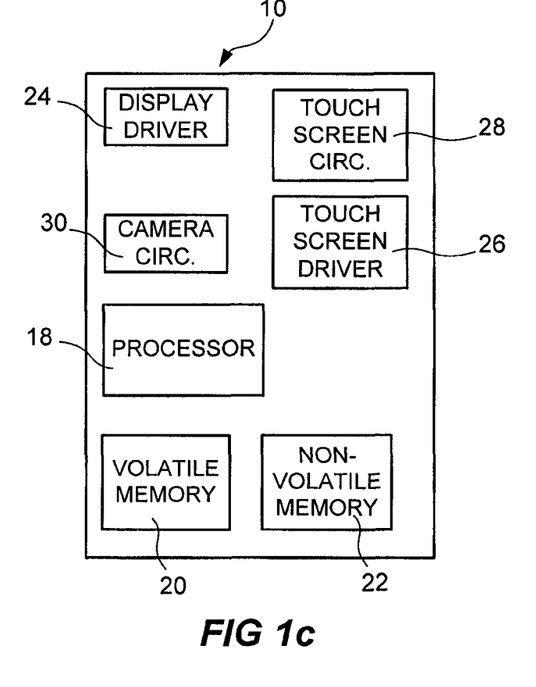
FIG. 1c is a schematic block diagram of the image presentation device in FIGS. 1a-b.

Moreover, now referring to FIG. 1c, the image presentation device 10 includes processor 18, a volatile memory 20, a non volatile memory 22, a display driver 24, a touch screen driver 26, touch screen circuitry 28, and camera circuitry 30 including an image sensor.

The processor 18, the volatile memory 20 and the non volatile memory 22 may be arranged and connected in a way known to the skilled person for operation of the image presentation device and execution of applications stored in the non-volatile memory 22.

The design and implementation of the touch screen circuitry 28 depends on the type of touch sensitive display that is to be used. The implementation of the touch screen driver 26 depends on the type of touch sensitive display and the operating system of the image presentation device 10.

In the present application the term touch sensitive display or touch screen is used for a display that is arranged to detect the presence, location, and/or movement of a "touch" within the display area. The touch screen may be designed to detect presence, location, and/or movement on the display by a finger, a hand, a stylus, a pen, etc.

Depending on the usage of the image presentation device one of a plurality of types of touch screens may be selected. For example may the touch screen be a resistive touch screen, a touch screen based on surface acoustic wave technology, a capacitive touch screen, a touch screen using surface capacitance, a touch screen based on projected capacitive touch technology, a system based on infrared LEDs and photo sensors, a system based on a strain gauge configuration, a touch screen based on dispersive signal technology, a touch screen based on acoustic pulse recognition technology, etc.

According to one embodiment a method for selecting images is part of a greater scheme of achieving a desired image having specific characteristics. The embodiment relates to an image selecting method operating on a group of digital image representations in order to achieve this result. The images forming the group of image representations may be images retrieved from a storage device, e.g. a hard drive, the non volatile memory 22, an image server accessed via a network, etc. The images may alternatively be acquired by means of a camera arranged in the device 10 or by means of transforming one original image retrieved from a storage device or one original image acquired by said camera. The image sequence may also be calculated from one or more source images, and the image itself may be virtual representation based on one or more mathematical schemes applied on one or more original images.

One example of how to generate the group of image representations are to bracket, i.e. to take photographs at more than one exposure in order to ensure that the desired exposure is obtained in at least one exposure. Other examples are to take a plurality of photographs at different points in time, different depth of field, at different focus distances, or by varying any other setting of the camera. The camera used in these examples may well be a camera implemented in the same device or system as the image presentation device 10. Moreover, the group of image representation may be generated from applying different transforms to the images.

Figure 2:
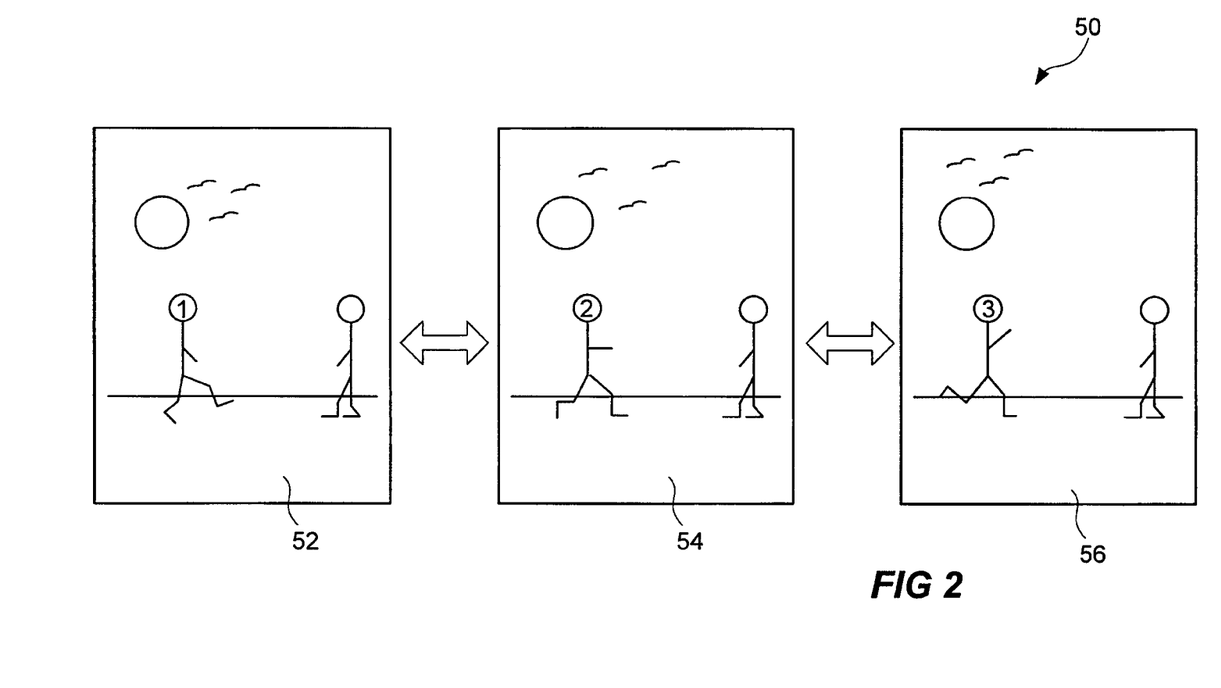
FIG. 2 shows a group of image representations according to one embodiment of the invention, FIG. 3a-d schematically shows acts of a method according to one embodiment of the invention.

The number of images in a group of image representations may be as few as two and as many as hundreds, it much depends on the application in which the method is planned to be used. The group of images may be separate images/photos or a sequence of frames in a video. In FIG. 2 a group of image representations 50 including three image representations is showed. In order to facilitate the depiction of the different images, this particular sequence of images represents photographs 52, 54, 56, also referred to as first, second and third photographs, taken at different points in time. Hence these images could very well have been taken by the camera of the device shortly before the user desides to use the selection method. The selection method may be started in many ways, e.g. by pressing a button on the image presentation device 10, by touching the touch sensitive display 14 by means of a pointing device either within a displayed image representation from the group of image representations or within an area on the display indicating a button for activiating this functionality.

FIG. 3 shows one embodiment of the invention by depicting subsequent acts of the selection method of this embodiment. The image presentation device 10 displays a representation of the second photograph 54, see FIG. 3a, from the group of image representations 50. Then the pointing device 70 is positioned to touch the touch sensitive display 14 at position 72, see FIG. 3b, and a position signal is generated, including the touch position, and is sent from the touch sensitive display 14 to the processor 18, i.e. from the touch screen circuitry 28 and the touch screen driver 26 to the processor 18.

Figure 3A:
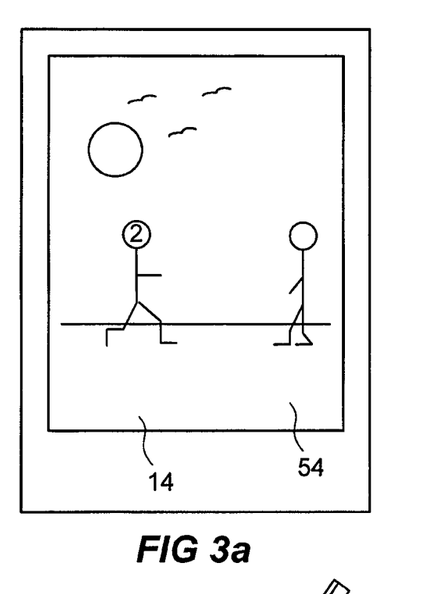
Figure 3B:
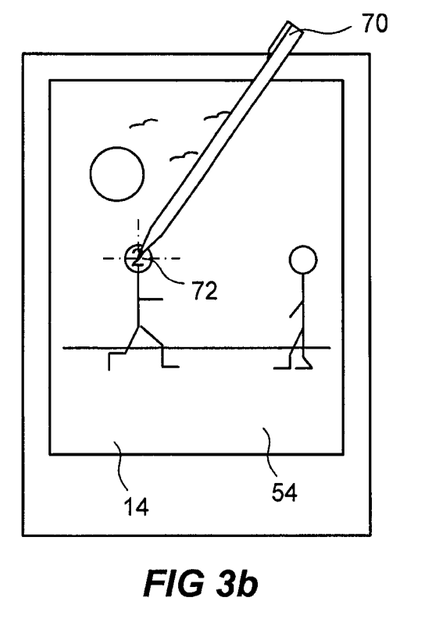
Figure 3C:
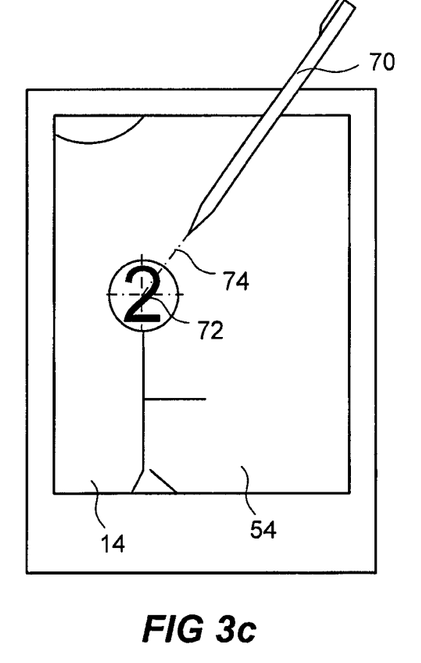

Then the touch sensitive display 14 detects a sliding motion 74, performed by means of the pointing device 70, along the display 14 away from the touch position 72. This detection results in the generation of a zoom signal that is sent to the processor 18. The zoom signal includes an indication of the distance of the sliding movement 74, referred to as zoom-value. Based on the zoom signal and the zoom value the displayed image representation 54 is enlarged to a degree that is based on the zoom value, see FIG. 3c. In the embodiment of FIG. 3c the enlarging of the image representation is centered at the touch position 72.

Figure 3D:
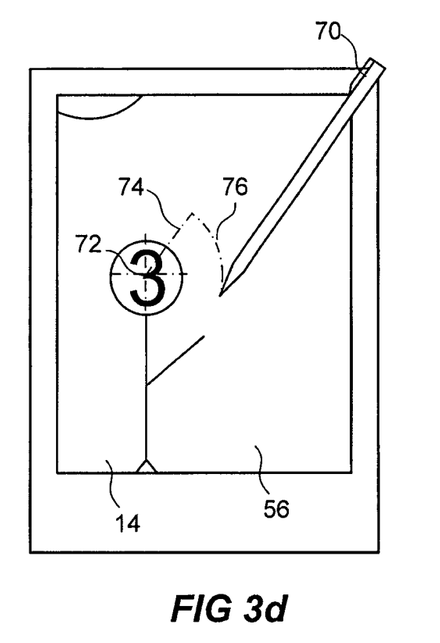

Now referring to FIG. 3d, the pointing device is moved in another direction 76, in this specific embodiment essentially perpendicular to previous movement 74. This second movement 76 may advantageously be following a circular trajectory, as indicated by 76 in FIG. 3d, in order to facilitating shifting through a large group of image representation without running out of touch sensitive display surface to slide on. The second sliding motion 76 is detected by the touch sensitive display 14 and a shift signal is generated and sent to the processor 18. In response to the shift signal the image displayed 54 is shifted to another image representation 56 in the group of image representations 50. In FIG. 3d the third photograph 56 is shifted in for display. In this embodiment the same enlargement is applied to the newly shifted image representation as for the previous.

The number of images shifted may be proportional to the length of the second sliding motion 76. Hence, in the example above, in which the group of image representations 50 only includes three photographs 52, 54, 56, the shift would continue to present the image representation of the first photograph if the second sliding motion 76 is continued.

According to another embodiment the enlargement is not applied to the entire image representation as depicted in FIGS. 3c and 3d, but rather to a predetermined area surrounding the touch position indicated by the position signal. The area may be defined by a radius and may be substantially circular.

According to yet another embodiment two pointing devices are used, e.g. a finger and the thumb of a users hand. In this embodiment a position signal is generated when the two pointing devices are detected on the touch sensitive display, the touch position being indicated as a position between the detection points of the two pointing devices.

Then, upon detection of the two pointing devices sliding away from each other, a zoom signal is generated and in response to the zoom signal an enlarged image representation of the image representation presently displayed is presented on the display. The degree of enlargement is based on the distance the two pointing devices have been sliding away from each other. Moreover, according to one embodiment, not the entire image representation is zoomed but only a subarea. The size of this sub area may correspond to an area defined by the initial positions of the pointing devices, i.e. when the touch position is indicated.

Then, in response to detection of a second sliding motion by the two pointing devices, wherein the two pointing devices are sliding at substantially constant distance from each other, a shift signal is generated and in response to the shift signal the image representation displayed is shifted to another image representation from the group of image representations. In one embodiment they are rotated substantially around a position in-between the two pointing devices and at a substantially constant distance from each other, e.g. following a substantially circular trajectory. The length of the sliding motion determines which image representation from the group of image representations to display. The enlargement applied to the initial image is displayed in the shifted images as well.

According to one specific embodiment only portions of the initially displayed image representation is shifted. The portion to be shifted may for instance be indicated manually by tracing the contours of the area and then the shifting results in that the corresponding area of another image from the group of image representations is displayed. The contours of the area can also be automatically computed by tracing where the two images', aligned to substantially same positions within the particular area, pixels are substantially similar around the traced contour. By means of this embodiment combined with a group of image representations being a bracketed image sequence it is possible to generate HDR images, High Dynamic Range images.

According to one embodiment the method may advantageously be used for browsing images. In such an application the zoom-in step may be skipped and a rotational/circular motion using one or two pointing devices may be used to switch images. In this embodiment the group of image representations probably includes the images of a folder in a file system or a database or of a particular category in a database.

According to one particular embodiment the image presentation device 10 is a mobile telephone equipped with a camera.

According to another aspect of the present invention yet another embodiment is shown in FIG. 4. The image presentation device 10 displays a representation of the second photograph 54, see FIG. 4a, from the group of image representations 50. Then the pointing device 70 is positioned to touch the touch sensitive display 14 at a first position 82, see FIG. 4b, and a position signal is generated, including the touch position, and is sent from the touch sensitive display 14 to the processor 18, i.e. from the touch screen circuitry 28 and the touch screen driver 26 to the processor 18.

Figure 4A:
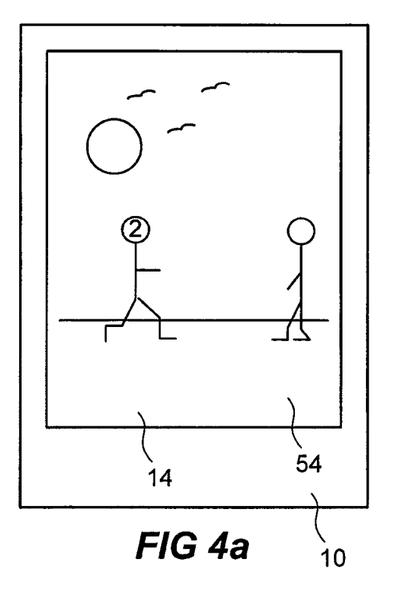
FIGS. 4a-d are representations of example displays according example embodiments.
Figure 4B:
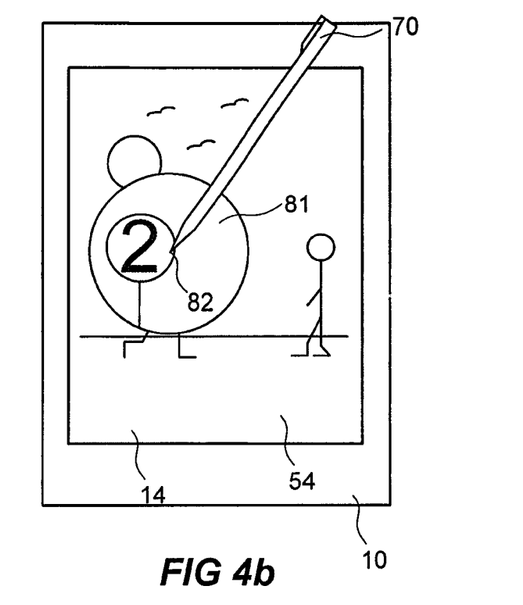

Then the displayed image representation 54 is enlarged to a degree that is based on a predetermined zoom value, see FIG. 4b. In the embodiment of FIG. 4b the enlarging of the image representation is centered at the touch position. According to this embodiment the enlargement is not applied to the entire image representation but rather to a predetermined area 81 surrounding the touch position indicated by the position signal. According to the in FIG. 4b shown embodiment the predetermined area 81 is defined by a radius and is substantially circular.

Figure 4C:
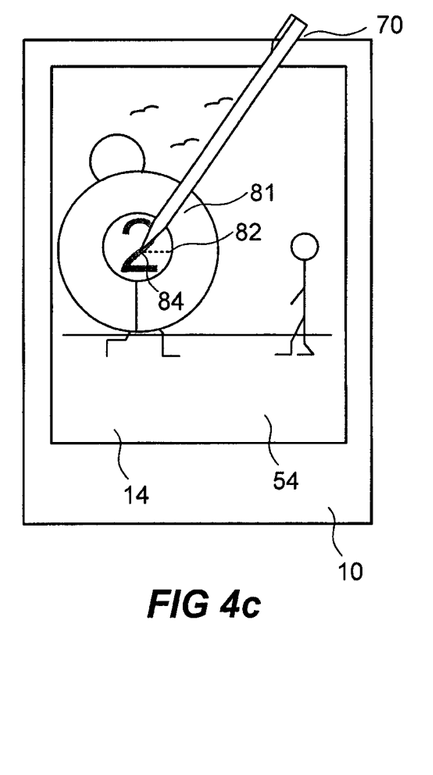

By moving the pointing device 70 on the touch sensitive display 14 from the first position 82 to a second position 84, see FIG. 4c, the touch position including the position signal is updated. The updated position signal is sent from the touch sensitive display 14 to the processor 18, i.e. from the touch screen circuitry 28 and the touch screen driver 26 to the processor 18. In response to the updated position signal the predetermined area 81 of the image representation that is enlarged, in this case image representation of the second photograph 54, is also updated so that the enlargement is applied to the predetermined area 81 surrounding the touch position indicated by the position signal. The predetermined area 81 of the image representation that is enlarged, in this case image representation of the second photograph 54, may be live updated whilst the pointing device 70 is moved from the first position 82 to the second position 84. Thus, as long as the pointing device 70 is moved along the trajectory between first position 82 to the second position 84 the predetermined area 81 of the image representation that is enlarged is live updated.

The size of the predetermined area 81 may be reduced or enlarged upon detection of two pointing devices sliding towards each other or away from each other, respectively. This may e.g. be done by pointing the two pointing devices on to opposite sections on the border of the predetermined area 81, respectively, and then sliding the two pointing devices towards each other or away from each other.

As a next step the image representation shown in the predetermined area 81 may be shifted. Now referring to FIG. 4d, the pointing device 70 is moved in a direction 86 along the border of the enlarged area of the image representation. Thus, according to this specific embodiment, along a substantially circular trajectory, as indicated by a sliding motion 86 in FIG. 4d, this in order to facilitating shifting through a large group of image representation without running out of touch sensitive display surface to slide on. The sliding motion 86 is detected by the touch sensitive display 14 and a shift signal is generated and sent to the processor 18. In response to the shift signal the image displayed in the enlarged predetermined area 81 is shifted to another image representation in the group of image representations 50, in this case to the image representation of the third photograph 56. In this embodiment the same enlargement is applied to the newly shifted image representation as for the previous.

Figure 4D:
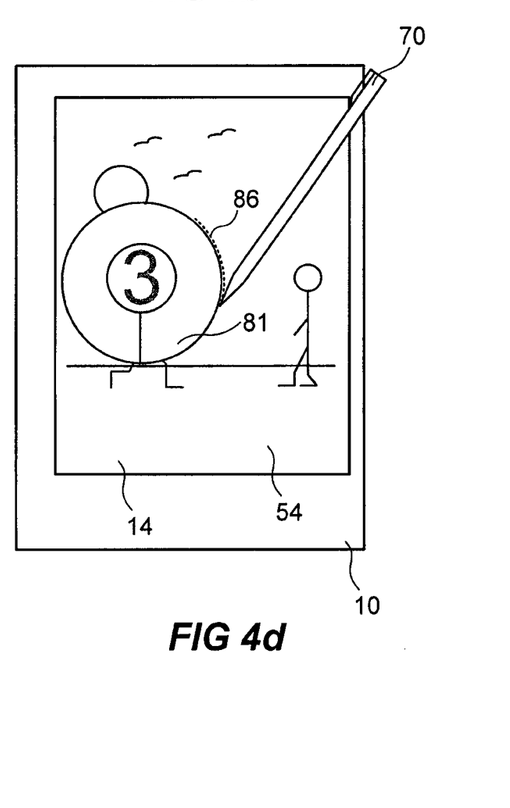

The number of images shifted may be proportional to the length of the sliding motion 86. Hence, in the example above, in which the group of image representations 50 only includes three photographs 52, 54, 56, the shift would continue to present the image representation of the first photograph 52 if the sliding motion 86 is continued.

Furthermore according to the above embodiment when a specific image representation has been selected among the group of image representations by performing the sliding motion 86 the not selected digital image representations of the group of digital image representations may be discarded.

It is recognized that the embodiment of FIG. 4 may be altered in various ways. For example, according to one embodiment the shifting of the image representations may be performed by moving the pointing device 70 in a substantially linear manner. This embodiment may be developed even further by showing small miniatures of the image representations at e.g. the bottom of the touch sensitive display 14. The shifting of the image representations may then be performed by moving the small miniatures by means of the pointing device 70 in a substantially linear manner along a path that is substantially parallel with the lower border of the touch sensitive display 14.

The invention claimed is:

1. A method for selecting a digital image representation comprising:
    forming a group of digital image representations;
    displaying on a touch sensitive display a first digital image representation from the group of digital image representations on the touch sensitive display;
    in response to a detection of a first user input at the touch sensitive display, generating a position signal indicative of a touch position;
    identifying an area at the touch position indicated by the position signal as a first portion of the first digital image representation within a second portion of the first digital image representation;
    receiving a second user input at the touch sensitive display and, in response to the received second user input, generating a first new composite image by displaying on the touch sensitive display the second portion of the first digital image representation but not the first portion of the first digital image representation and displaying on the touch sensitive display, in the area at the touch position, a third portion extracted from a second digital image representation from the group of digital image representations, which third portion is automatically identified by comparing the first portion of the first digital image representation to the second digital image representation; and
    receiving a third user input at the touch sensitive display and, in response to the received third user input, generating a second new composite image by displaying on the touch sensitive display the second portion of the first digital image representation but not the first portion of the first digital image representation nor the third portion of the second digital image representation and displaying on the touch sensitive display, in the area at the touch position, a fourth portion extracted from a third digital image representation from the group of digital image representations, which fourth portion is automatically identified by comparing the first portion of the first digital image representation to the third digital image representation.

2. A method as claimed in claim 1, wherein the first user input comprises a sliding motion of a pointing device at the touch sensitive display in a direction along a border of the area at the touch position.

3. A method as claimed in claim 2, wherein the second user input comprises a further sliding motion of a pointing device at the touch sensitive display in a direction along the border of the area at the touch position.

4. A method as claimed in claim 1, wherein the third portion extracted from the second digital image representation corresponds or is similar to the first portion of the first digital image representation.

5. A method as claimed in claim 4, wherein the third portion extracted from the second digital image representation comprises pixels that are substantially similar to pixels of the first portion of the first digital image representation.

6. A method according to claim 1, wherein the first portion of the first digital image representation is displayed as an enlarged representation of the first portion.

7. A method according to claim 1 comprising generating a zoom signal in response to at least a further touch at the touch sensitive display, and displaying a representation of a portion of a digital image representation dependent upon the zoom signal.

8. A method according to claim 1 comprising selecting the third portion extracted from the second digital image representation from the group of digital image representations to replace the first portion of the displayed first digital image representation.

9. A method according to claim 8, further comprising discarding the not selected digital image representations from the group of digital image representations.

10. A method according to claim 1, comprising displaying the other digital image representations, or comprising displaying miniatures of the digital image representations.

11. A method according to claim 1, wherein the group of digital image representations comprises any of or any combination of:
    images retrieved from a storage device; or
    images of essentially the same view, captured at different points in time; or
    images of essentially the same view, captured with different exposure settings; or
    images of essentially the same view, captured with different focus distances; or
    images of essentially the same view, exposed for different transforms.

12. A method according to claim 1 wherein the group of digital image representations comprise images captured of a same scene at a same field of view.

13. A method as claimed in claim 1, wherein comparing the first portion of the first digital image representation to the second digital image representation comprises comparing a content of the first portion of the first digital image representation to a content of the second digital image representation.

14. A method as claimed in claim 1, wherein the area at the touch position comprises an area within a predetermined radius of the touch position.

15. An image presentation device comprising:
    memory for storing a group of digital image representations,
    a touch sensitive display for receiving user inputs and displaying a first digital image representation from the group of digital image representations, and a processor for, in response to a detection of a first user input at the touch sensitive display, generating a position signal indicative of a touch position, wherein the processor is configured to:

identify an area at the touch position indicated by the position signal as a first portion of the first digital image representation within a second portion of the first digital image representation;

generate a first new composite image, in response to a second user input at the touch sensitive display, by displaying on the touch sensitive display the second portion of the first digital image representation but not the first portion of the first digital image representation and displaying on the touch sensitive display, in the area at the touch position, a third portion extracted from a second digital image representation from the group of digital image representations, which third portion is automatically identified by the processor by comparing the first portion of the first digital image representation to the second digital image representation; and generate a second new composite image, in response to a third user input at the touch sensitive display, by displaying on the touch sensitive display the second portion of the first digital image representation but not the first portion of the first digital image representation nor the third portion of the second digital image representation and displaying on the touch sensitive display, in the area at the touch position, a fourth portion extracted from a third digital image representation from the group of digital image representations, which fourth portion is automatically identified by the processor by comparing the first portion of the first digital image representation to the third digital image representation.

16. An image presentation device according to claim 15, wherein the first user input comprises a sliding motion of a pointing device at the touch sensitive display in a direction along a border of the area at the touch position.

17. An image presentation device according to claim 15 wherein the display is any of or any combination of:
- a resistive touch screen; or
- a touch screen based on surface acoustic wave technology; or
- a capacitive touch screen; or
- a touch screen using surface capacitance; or
- a touch screen based on projected capacitive touch technology; or
- a system based on infrared LEDs and photo sensors; or
- a system based on a strain gauge configuration; or
- a touch screen based on dispersive signal technology; or
- a touch screen based on acoustic pulse recognition technology.

18. An image presentation device according to claim 15 wherein the group of digital image representations comprise images captured of a same scene at a same field of view.

19. An image presentation device comprising:

storage means for storing a group of digital image representations;

a touch sensitive display for receiving user inputs and displaying a first digital image representation from the group of digital image representations;

processor means for, in response to a detection of a first user input at the touch sensitive display, generating a position signal indicative of a touch position;

means for identifying an area at the touch position indicated by the position signal as a first portion of the first digital image representation within a second portion of the first digital image representation;

means for generating a first new composite image, in response to a second user input at the touch sensitive display, by displaying on the touch sensitive display the second portion of the first digital image representation but not the first portion of the first digital image representation and displaying on the touch sensitive display, in the area at the touch position, a third portion extracted from a second digital image representation from the group of digital image representations, which third portion is automatically identified by the processor means by comparing the first portion of the first digital image representation to the second digital image representation; and means for generating a second new composite image, in response to a third user input at the touch sensitive display, by displaying on the touch sensitive display the second portion of the first digital image representation but not the first portion of the first digital image representation nor the third portion of the second digital image representation and displaying on the touch sensitive display, in the area at the touch position, a fourth portion extracted from a third digital image representation from the group of digital image representations, which fourth portion is automatically identified by the processor means by comparing the first portion of the first digital image representation to the third digital image representation.

* * * * *